Jan. 29, 1952     C. A. WENDEL     2,583,676
COLOR SCOPE
Filed July 11, 1950

Clifford A. Wendel
INVENTOR.

Patented Jan. 29, 1952

2,583,676

UNITED STATES PATENT OFFICE 2,583,676

COLOR SCOPE

Clifford A. Wendel, Butte, Mont.

Application July 11, 1950, Serial No. 173,087

2 Claims. (Cl. 88—15)

This invention relates to an optical device primarily designed as an amusement device for children and for esthetic enjoyment by adults.

The primary object of the invention is to provide a color scope of novel construction wherein color slides may be moved before the objective end of a tube and viewed through the opposite ocular end, the tube including reflectors of such shapes and positions within the tube to provide symmetrical and interesting images which may be changed as to configuration and color content.

Another object of the invention is to provide an educational and amusement device comprising a color scope including an outer cylindrical tube having a viewing aperture at one end, an inner tubular member within said outer tube having an open end of circular cross-section adjacent said one end of said outer tube and an opposite open end of elliptical cross-section adjacent the other end of said outer tube, said inner tubular member having an inner reflecting surface, slotted color slides, and means for slidably supporting said slides at the other end of said outer tube in front of said elliptical open end.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification similar reference characters indicate corresponding elements throughout.

Figure 1:
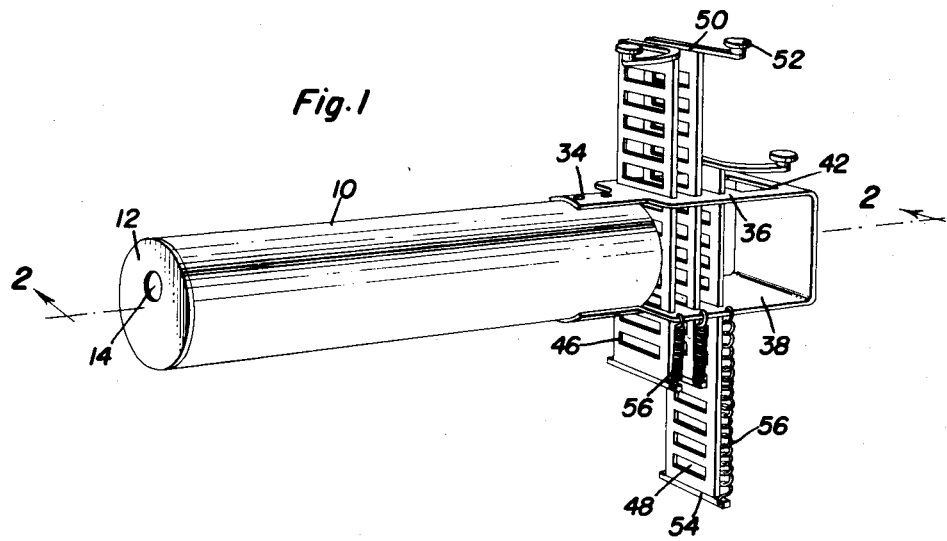
Figure 1 is a perspective view of the device.
Figure 2:
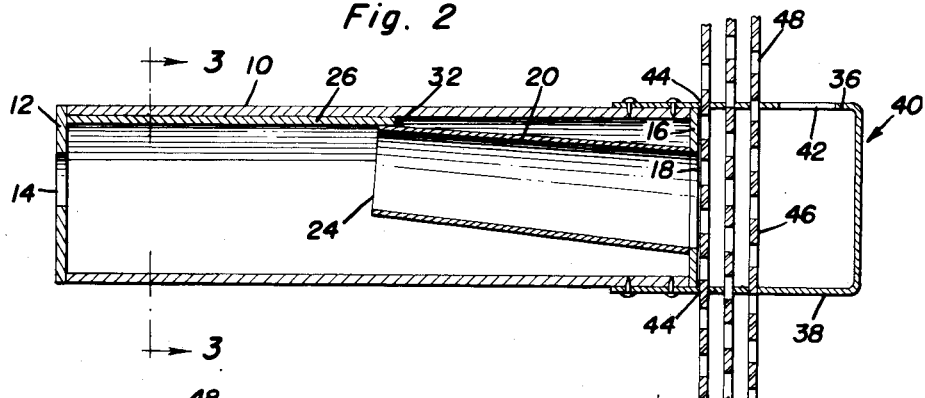
Figure 2 is a sectional view taken on the line 2—2 of Figure 1.
Figure 3:
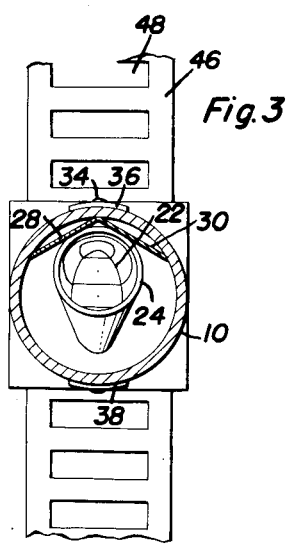
Figure 3 is a sectional view taken on the line 3—3 of Figure 2.
Figure 4:
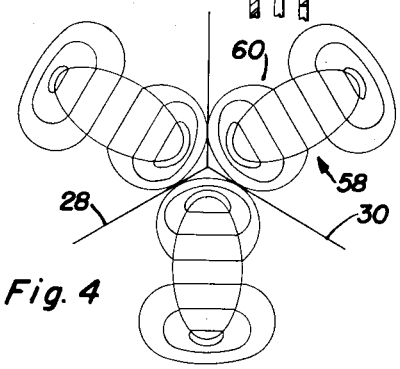
Figure 4 is a diagrammatic view of an image seen in the device.

The device includes an outer tube 10 fabricated of metal, cardboard, wood and the like materials and is of circular cross-section, one end of the tube including a closure plate 12 having a sight opening or ocular 14. The other end of the tube also has a closure plate 16 with an opening 18 therethrough.

Positioned within the outer tube is an inner open-ended tube 20 having a highly reflective inner surface, the tube being flattened at one end to form an elliptical cross-section 22 adjacent the opening 18 and an opposite open end of circular cross-section 24 adjacent the ocular 14. The longitudinal axis of the inner tube 20 is at an angle to the longitudinal axis of the outer tube 10 so that the circular end 24 is elevated relative to the elliptical end 18.

An angulated plate 26 is provided having an inner reflecting surface, the legs 28 and 30 of which straddle and are secured to, as by soldering 32, the outer surface of the inner tube 20 adjacent the circular open end 24, the plate extending in the direction of the ocular end of the outer tube. The angle between the legs 38 and 30 is preferably 120°. The longitudinal axis of the angulated plate is parallel to that of the outer tube and at a slight angle to that of the inner tube.

Secured as by appropriate headed pins 34 to the outer surfaces of the outer tube 10 and adjacent the opening 18 are the legs 36 and 38 of a U-shaped slide holder 40, the upper leg 36 including a light-receiving aperture 42. The legs include longitudinally spaced, vertically aligned slots 44 for slidably receiving color slides 46 of translucent colored materials, such as plastics, having vertically spaced slots 48. The upper end of each slide includes a handle 50 including a finger key 52 while the lower end is enlarged as at 54 to prevent removal of the slide from the holder. Each slide is secured to the holder 40 by a coil spring 56 terminally secured to the enlarged end 54 and to the leg 38 of the holder, the spring normally urging the slide upwardly as shown clearly in Figure 1.

In operation, the scope is positioned so that the aperture 42 is beneath of and rather close to a bright light. The operator, looking through the ocular 14 sees reflected from the angulated mirror 26 three symmetrically arranged images 58 having color bands of the slides distorted into curved lines by the inner tube 20. As the keys 52 are depressed, the curved color lines 60 advance or recede and change colors. The transluency of the slides aids the brilliancy of the color effects and the black background of the back of the holder 40 heightens these effects. The patterns and colors of the image are changed by pressing down or releasing the finger keys.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An educational and amusement device comprising a color scope including an outer sighting tube having an ocular end with an ocular opening therein, and an objective end with a reduced axial objective opening therein, an inner relatively smaller tube fixed in said outer tube with a portion of elliptical cross-section terminating in an elliptical end at said objective opening, said inner tube having a circular portion terminating in a circular end spaced from the ocular end of the outer tube and elevated in said outer tube so that the longitudinal axis of the inner tube is at an angle to the longitudinal axis of the outer tube, a reflecting plate in the outer tube elevated therein and extending from the ocular end of the outer tube to and above the circular end of the inner tube and constructed and arranged for coaction with said inner tube to provide a kaleidoscopic reflection of images at the objective end of the outer tube, a slide support at the objective end of the outer tube, and slotted differently colored slides in said support relatively slidable for variably coloring the reflected image.

2. A device according to claim 1 wherein said reflected plate is of angulated form one end of said plate straddling and being secured to the circular end of said inner tube.

CLIFFORD A. WENDEL.

REFERENCES CITED

The following references are of record in the file of this patent:

UNITED STATES PATENTS

| Number | Name | Date |
|---|---|---|
| 770,766 | Nenchen | Sept. 27, 1904 |
| 2,152,050 | Henning et al. | Mar. 28, 1939 |
| 2,423,371 | Carranza | July 1, 1947 |
| 2,457,415 | Sziklai | Dec. 28, 1948 |
| 2,493,237 | Eddy | Jan. 3, 1950 |

FOREIGN PATENTS

| Number | Country | Date |
|---|---|---|
| 2,290 | Great Britain | of 1873 |